Feb. 10, 1931.   W. A. KULL ET AL   1,791,819
STEERING MECHANISM
Filed Feb. 18, 1928   2 Sheets-Sheet 1

Inventors
Walter A. Kull &
Harry M. Denyes
By
Blackmore, Spencer & Hush
Attorneys

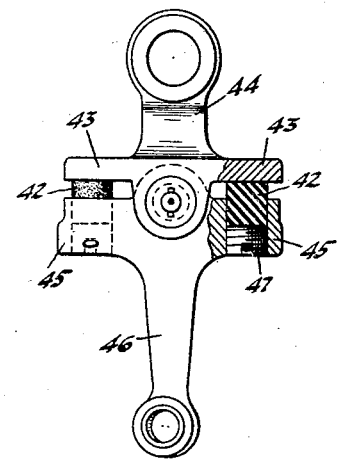
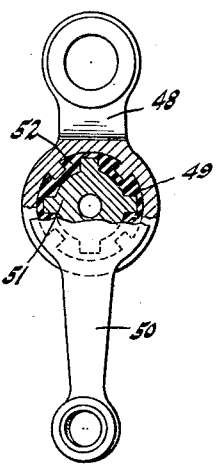
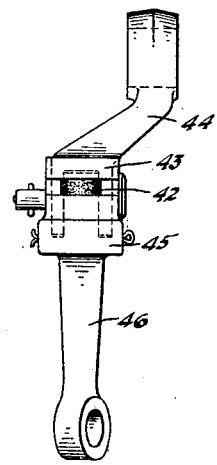
Fig. 9    Fig. 11    Fig. 10
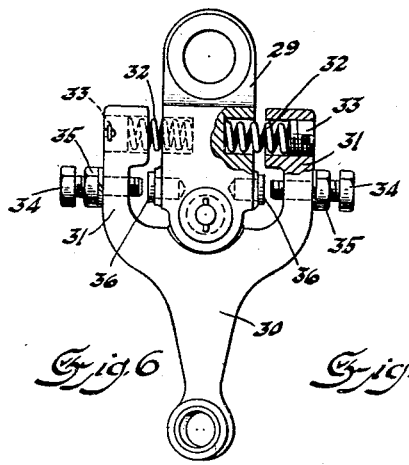
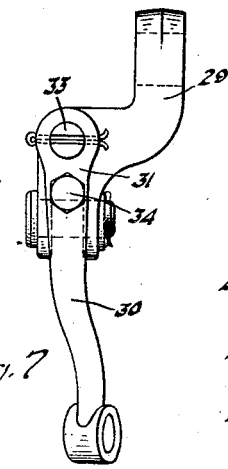
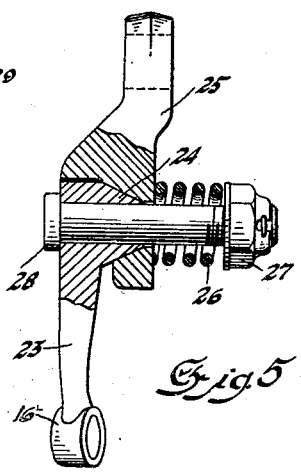
Fig. 6    Fig. 7    Fig. 5
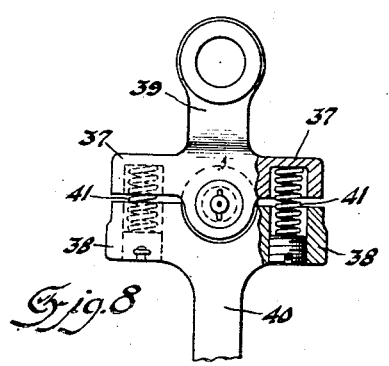
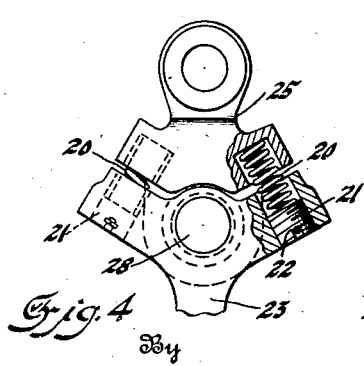
Fig. 8    Fig. 4
Inventors
Walter A. Kull &
Harry M. Denzes
By
Blackmore, Spencer & Flint
Attorney

Patented Feb. 10, 1931

1,791,819

UNITED STATES PATENT OFFICE

WALTER A. KULL AND HARRY M. DENYES, OF SAGINAW, MICHIGAN, ASSIGNORS TO GENERAL MOTORS CORPORATION, OF DETROIT, MICHIGAN, A CORPORATION OF DELAWARE

STEERING MECHANISM

Application filed February 18, 1928. Serial No. 255,437.

This invention relates to motor vehicles and more particularly to an improvement in steering mechanisms therefor.

The object of the invention is to provide an arrangement for eliminating front wheel wobble or shimmy, and for dampening the effects thereof on the steering gear mechanism and steering wheel, whereby annoying vibrations in the steering column, and undue wear and breakage of parts are reduced, and the automobile driver is relieved of tiring strains and shocks on the human nervous system.

A further object of the invention is to provide an improved steering arm of jointed construction, embodying resilient motion transmitting elements that afford a cushion against sharp reactions; which arm is of simple construction so as to be economical in manufacture, and which may be readily substituted for steering arms already in use on existing vehicles, or applied as standard equipment on new cars.

Figure 1:
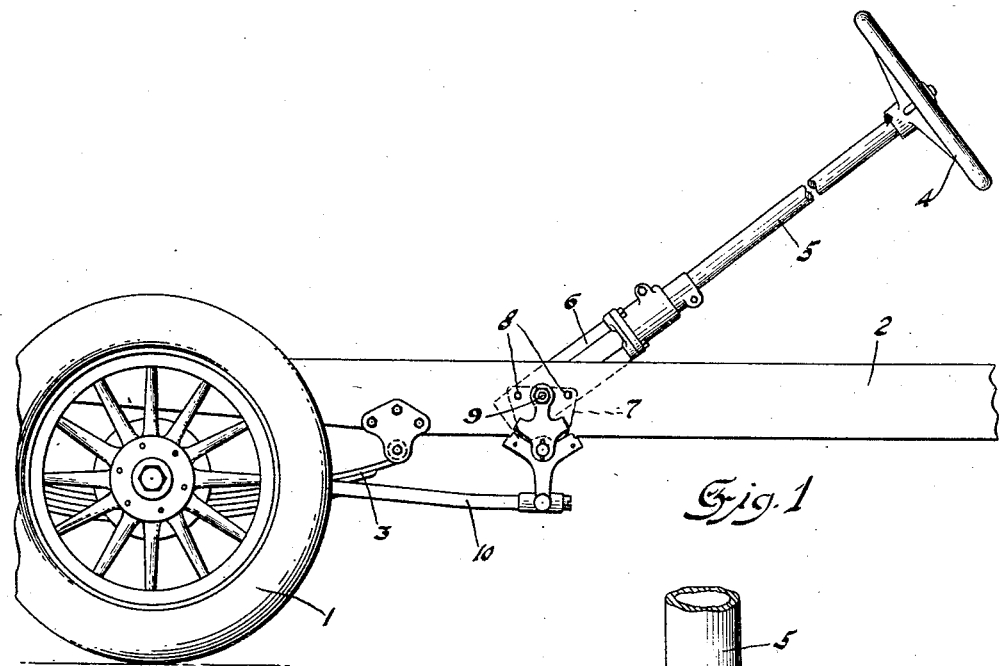
Figures 2, 3:
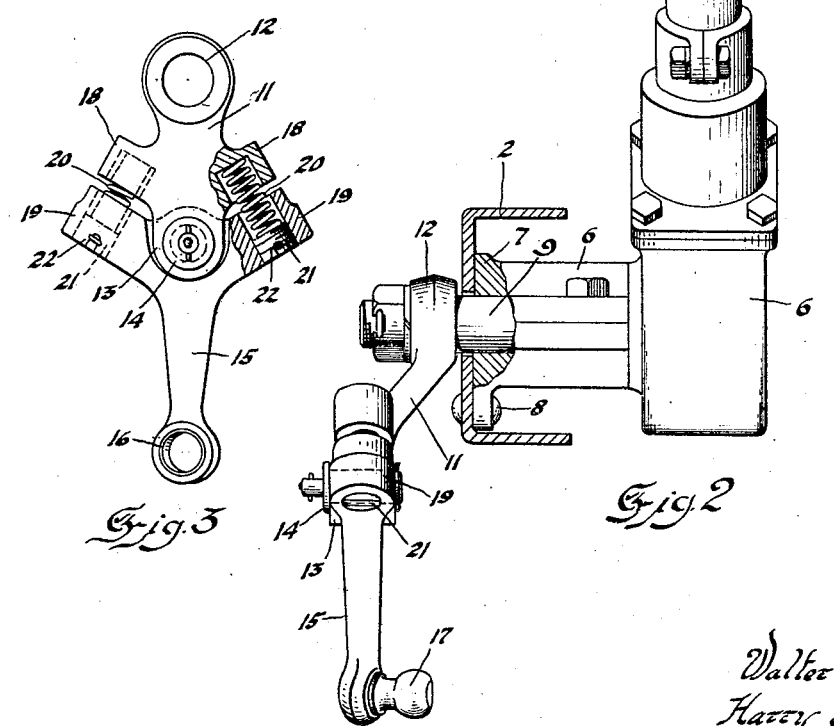

Further objects and advantages will be apparent from the following specification, taken in connection with the accompanying drawings, in which, Figure 1 is a fragmentary side elevation of a portion of an automobile chassis frame, with the steering mechanism mounted thereon. Figure 2 is a transverse sectional view through the chassis frame showing the steering mechanism in rear end elevation. Figure 3 is a detail front elevational view of a jointed steering arm. Figure 4 is a detail front elevation of a slightly modified form of jointed steering arm. Figure 5 is a side view, partly in section, of the arm shown in Figure 4. Figure 6 is a front view of a lever arm, illustrating an alternative arrangement of structural details. Figure 7 is a side view of the arm shown in Figure 6. Figure 8 is a front view illustrating another alternative arrangement of parts. Figure 9 is a view similar to Figure 8 showing the use of a different type of cushioning element. Figure 10 is a side view of the Figure 9 lever, and Figure 11 is a front elevation, partly in section, of a further modified form of jointed lever arm.

Referring to the drawings, the numeral 1 designates a front road wheel, carried on an axle which supports the chassis frame 2 on flexible multiple leaf springs 3, in the conventional manner. Mounted at its lower end on the chassis frame is a steering column, comprising a steering wheel 4, a post 5 and steering gear mechanism enclosed within a housing or casing 6, which is provided with a lateral bracket extension 7 for attachment as by means of bolts or rivets 8 to the side frame members. A rock shaft 9 extends from the steering gear mechanism through the bracket extension 7 to the outside of the frame where it carries a rock lever or steering arm, connected at its lower end as by means of a ball and socket joint, with the customary drag link or draw bar 10 for swinging the front wheels to guide or control the direction of travel of the vehicle.

The thing with which this invention is particularly concerned is the swinging lever arm which comprises two parts joined together for a limited pivotal movement relative to each other and against the influence of interposed tension springs. Such jointed parts may be referred to as an upper member 11, having an eye 12 at one end to be fixedly secured for swinging movement with the rock shaft 9, and a pair of dependent spaced ears 13 at the opposite end between which there is pivotally secured by a pin 14, a shouldered portion at the upper end of the lower member 15, which has an eye 16 at its lower end for the attachment of a ball stud 17, engageable within the socket carried at the extremity of the drag link 10.

In the construction shown in Figure 3, each lever arm member 11 and 15 is provided adjacent the joint with a pair of lateral projections or feet 18—19, respectively, extending at right angles to the axis of the pivot pin 14 and to either side thereof. A pair of coil springs 20 are interposed between the feet, and are preferably seated within aligned openings or depressions in the adjacent faces of the feet. For convenience in manufacture and assembly, the depressions in the feet 19 may be formed by providing a hole extending through each foot, which is closed by a threaded plug or nut 21, adjustably screw threaded therein and held in its adjusted position by a rivet or pin 22. The depressions in the adjacent faces of the seat are so arranged that the springs 20 will lie along lines extending radially of the axis of the rock shaft, or divergently with respect to each other. It will be apparent that since the springs act in opposition to each other the tension of one will balance the other so that there will be present a tendency toward self centering of the lever arm members. The resiliency of the springs cushions sharp reactions occurring in either direction and particularly those set up by wheel wobble, whereby vibratory periods are not permitted to build up in amplitude or magnitude, or be transmitted to the steering gear mechanism and steering wheel.

In some installations it may be found desirable to provide a certain degree of frictional resistance to the free pivotal movement in the connecting joint between the lever arm members. For this purpose the construction shown in Figures 4 and 5 may be employed, wherein the lower arm member 23 is provided with a tapered or conical head 24 seated within a conical opening in the upper arm member 25 and yieldingly held on its seat by a coil spring 26, bearing at one end against the member 25 and at its other end against a nut 27, adjustably screw threaded on the bolt 28 extending through the head 24. Adjustment of the nut 27 permits the tension of the spring 26 to be varied to change the amount of frictional resistance offered to relative movement of the lever arm parts. The construction may be otherwise as before described.

In the modified type of jointed lever arm shown in Figures 6 and 7, the upper member 29 is devoid of lateral feet and instead the lower member 30 is provided with a pair of arms 31, extending upwardly beyond the connecting joint and on either side of the member 29. The cushioning springs 32 are arranged transversely, being seated within depressions in the sides of the member 29 and in openings through the upwardly extending arms 31, which are closed by the plugs 33. Set screws 34, carrying lock nuts 35, extend through the arms 31 and are adapted to contact or abut against the bearing surfaces afforded by the heads of studs 36, carried by the member 29, to provide a positive stop for limiting relative movement between jointed members.

Figure 8 represents an arrangement similar to that shown in Figure 3, except that the laterally extending feet 37 and 38 of the jointed arm members 39 and 40 respectively, extend substantially at right angles to the lever, and the cushioning springs 41 are arranged parallel to each other rather than divergently.

In lieu of helical coil springs, use may be made of non-metallic elastic material such as rubber or the like. If desired, small blocks of rubber or other similar deformable substance may be substituted in place of coil springs in the jointed steering arms heretofore described after the fashion illustrated in Figure 9, wherein the blocks 42 bearing against the feet 43 of the upper member 44 are carried within openings in the feet 45 of the lower member 46. The blocks 42 may be placed under an initial degree of pressure by the adjustment of plugs 47, screw threaded in the openings to take away their excessive responsiveness to deformation and afford increased life thereto. As further showing the use of an elastic deformable material, the lever arm of Figure 11 comprises an upper member 48 having a hollow circular head or eye 49 and a lower member 50 having a lateral projection or spindle 51 extending into the eye 49, the interior of the eye and the exterior of the spindle being provided with transverse ribs or teeth which alternate with each other; between which spindle and eye there is interposed a body 52 of rubber or the like for deformation to accommodate and cushion relative movement.

Having thus described our invention, we claim:

1. An articulated steering arm, including two members arranged end to end and pivotally connected at adjacent ends with each other, lateral feet formed on the respective members adjacent their pivotal connection, and having aligned depressions in adjacent faces, and a resilient element interposed between said feet and seated within said depressions, one of said depressions being formed by a plug adjustably screw threaded within an opening extending through one of the feet, the adjustment of which plug varies the resiliency of said element.

2. A jointed lever arm, including a lever arm member having one end fixedly secured on a rock shaft, a second lever arm member having one end pivotally connected with the other end of the first mentioned lever arm member, and its other end connected with a drag link, a pair of lateral feet extending on opposite sides of the respective members adjacent their pivotal connection and at right angles to their pivotal axis, and spring elements interposed between said feet and exerting their tension in opposition to each other and on divergent lines extending from a point substantially at the axis of the rock shaft.

3. In steering mechanism of a motor vehicle, an articulated steering arm adapted to damp vibratory movement originating in the road wheels, comprising one member having one end fixedly secured on a rock shaft, a second member having one end pivotally connected with the opposite end of the first mentioned member, and its opposite end connected with a drag link, a pair of lateral feet extending on opposite sides of the adjacent interconnected ends of the members and at substantially right angles to the pivotal axis of the interconnection therebetween, and motion transmitting spring elements interposed between adjacent feet.

4. Steering mechanism including in combination, a drag link, steering column gear mechanism having a rock shaft associated therewith, and motion transmitting means interposed between the rock shaft and drag link, comprising a pair of jointed lever arm elements, one of which is connected with the drag link and the other of which is secured to the rock shaft for swinging movement therewith, lateral feet extending from opposite sides of the respective elements adjacent the joint therebetween, said feet having aligned depressions in opposing faces thereof, which extend in radial directions with respect to the axis of the rock shaft and resilient elements seated within each pair of aligned depressions and being adapted to transmit swinging movement from one lever arm element to the other.

5. Steering mechanism including in combination, a drag link, steering column gear mechanism having a rock shaft associated therewith, and motion transmitting means interposed between the rock shaft and drag link comprising a pair of jointed lever arm elements, one of which is connected with the drag link and the other of which is secured to the rock shaft for swinging movement therewith, lateral feet extending from opposite sides of the respective elements adjacent the joint therebetween, and resilient cushioning members interposed between said feet and extending in divergent relation along lines radiating from substantially the axis of said rock shaft.

6. Steering mechanism including in combination, a drag link, steering column gear mechanism having a rock shaft associated therewith, and motion transmitting means interposed between the rock shaft and drag link comprising a pair of jointed lever arm elements, one of which is connected with the drag link and the other of which is secured to the rock shaft for swinging movement therewith, and resilient cushioning members interposed between said elements and extending in divergent relation along lines radiating from substantially the axis of the rock shaft.

7. Steering mechanism including in combination a drag link, steering column gear mechanism having a rock shaft associated therewith, and motion transmitting means interposed between the rock shaft and drag link comprising a pair of jointed lever arm elements, one of which is connected with the drag link and the other of which is secured to the rock shaft for swinging movement therewith, and resilient cushioning members interposed between adjacent portions of said lever arm elements, and means to offer frictional resistance to relative movement of said jointed lever arm elements.

8. Steering mechanism including in combination a drag link, steering column gear mechanism having a rock shaft associated therewith, and motion transmitting means interposed between the rock shaft and drag link comprising a pair of jointed lever arm elements, one of which is connected with the drag link and the other of which is secured to the rock shaft for swinging movement therewith, and resilient cushioning members interposed between adjacent portions of said lever arms elements, the joint between said lever elements including a conical head on one of the elements having a seating engagement within a conical socket formed in the other element, a stud on one of the elements, a spring carried thereby for yieldingly holding said conical head in its socket, and means to vary the tension of said spring.

In testimony whereof we affix our signatures.

WALTER A. KULL.
HARRY M. DENYES.